S. C. DOBSON.
EDUCATIONAL APPLIANCE.
APPLICATION FILED SEPT. 23, 1918.
1,315,478.
Patented Sept. 9, 1919.
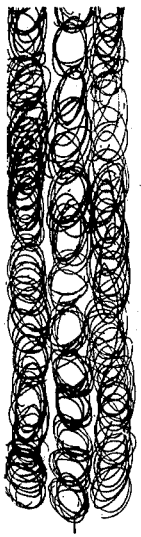
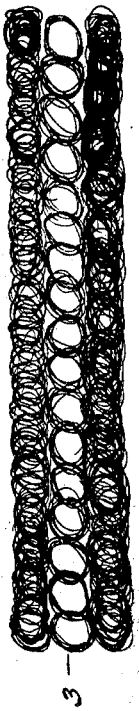
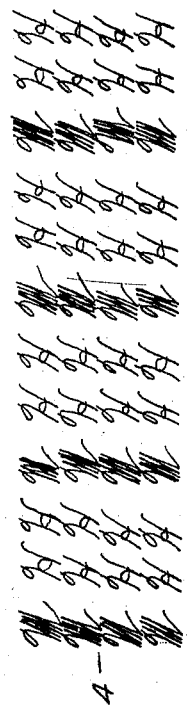
INVENTOR.
Schuyler C. Dobson
BY
Edwin P. Corbett
ATTORNEY.

UNITED STATES PATENT OFFICE.

SCHUYLER C. DOBSON, OF COLUMBUS, OHIO.

EDUCATIONAL APPLIANCE.

1,315,478.     Specification of Letters Patent.     Patented Sept. 9, 1919.

Application filed September 23, 1918. Serial No. 255,252.

*To all whom it may concern:*

Be it known that I, SCHUYLER C. DOBSON, a citizen of the United States of America, residing at Columbus, in the county of Franklin and State of Ohio, have invented certain new and useful Improvements in Educational Appliances, of which the following is a specification.

My invention relates to educational appliances and has to do particularly with a device that will aid all students and, in fact, people generally, to grade their writing scientifically with little effort. It takes the form of a tablet of novel structure which is primarily adapted for use by students, though not necessarily limited thereto. The tablet contains sample plates of penmanship, preferably photographed from actual samples of the writings of students of different grades. It also contains blank sheets to be written upon as in any tablet, this written matter being thus readily comparable with the photographed samples for grading.

The idea may be utilized for any class of scholars, as well as for students of penmanship. It is best illustrated by explaining and describing a tablet made for use by a particular grade or grades. For instance, in practice, I preferably use a single tablet for the third and fourth grades. This tablet desirably contains penmanship plates and detachable blank sheets.

An illustration of the permanent plates of my tablet will be found in the accompanying drawings wherein:

The figure shows one of the permanent plates and part of another.

In the drawings, it will appear that the plates are designated third and fourth grade coupled with the numbers 85 and 45, respectively, as at 1. Immediately beneath the line containing this subject-matter, there is a brief paragraph of instructions, criticisms and suggestions. To give a more comprehensive understanding of the form which these paragraphs may take, I am tabulating the paragraphs that I usually use for the third and fourth grades. It will be understood however that the wording of these paragraphs may be changed without departing from the spirit of my invention and that, also, the wording for the other grades will very probably differ from the wording for the third and fourth grades. The wording for the third and fourth grades, however, is preferably as follows:

*Third and (45) fourth grades.*

Compare your work with this lowest mark first. You can mark from 40 to 50 any work you measure by this page. This paper is very poor. Make all your work better than this page.

*Third and (55) fourth grades.*

Your paper may look somewhat like this page. If it does you must give it a mark somewhere between 50 and 60. Study to see why this paper is marked so low. You can find out. It will help your work.

*Third and (65) fourth grades.*

This page was written by a pupil, in a regular writing lesson and he had never written this copy before. It is a fair test for any writing lesson. Make yours better next time. Good writing requires practice.

*Third and (75) fourth grades.*

The movement in this page is worth more than 75 and some of the writing is not worth 75 but you may mark your page between 70 and 80 as it compares with this plate. It may be better.

*Third and (85) fourth grades.*

Compare your paper with this one for proper slant, smoothness, movement. Good capital letters. Good small letters. If it compares well in every way give it the 85 mark. If not so good as this, turn to the other papers.

*Third and (95) fourth grades.*

If your writing is as good as this page, give it the same grade as marked in the circle above. If not, turn to next, etc. This is a good paper. Try to have many of yours as good as this.

Beneath each paragraph of instructions, suggestions, et cetera, I desirably place several lines of exercises as at 3. Below these, there are a number of lines of letters 4 and then there are a number of lines of words 5. Variations in this substance or arrangement may be made, at will.

The pupil's task is to write any selected matter on one of the plain sheets of the tablet. Then he is to compare his efforts with the plates and select the plate most similar to his completed effort. Having determined upon one plate, he should mark his own work in accordance. For instance, if his work approximates the plate marked 85, he should mark his own work between 80 and 90 per cent.

The sample plates are preferably made in a manner calculated to be scientifically exact. Desirably, a number of samples of actual writing are taken from each grade or each couple of grades. These samples are classified and then valued. Then the papers that most nearly represent the middle point between marks 100 to 90, 90 to 80, 80 to 70, 70 to 60, and 60 to 50, for each grade are selected and photographed. These photographs are used for samples in the manner indicated. It will be seen that each sample constitutes a standard which may be fairly set before the student.

It will be obvious that I have provided a device which will enable a student to teach himself, if he is in earnest. In addition, it will greatly facilitate the work of the teacher, for it is obvious that she will be enabled to take care of a much larger class of students with these tablets.

It is important to note that these tablets offer a means for, not only setting standards for penmanship in penmanship classes, but they serve as standards of possible achievement for children in all their writing, and even for adults. As far as students are concerned, it is a recognized fact that they rarely write as well in other classes and outside of school as they do in their penmanship classes. These tablets offer the teachers of various subjects a ready means for grading all written work for penmanship. Not only this, but the pupils must inevitably be impressed with the fairness of the system, for I have a definite standard which each pupil knows he must meet and concerning which he can have no misunderstanding with his teacher, inasmuch as the test never depends on the individual judgment of the teacher to any material extent.

Having thus described my invention, what I claim is:

1. An educational device comprising sample handwriting tests each marked to indicate percentage of perfection and blank spaces for comparative practice work.

2. An educational device comprising a tablet with sample penmanship plates each marked to indicate percentage of perfection, and blank sheets.

3. An educational device comprising a tablet with sample penmanship plates, ranging through a series of selected percentages of perfection and each marked accordingly, and blank sheets.

4. An educational device comprising a tablet with permanent sample handwriting tests each marked to indicate percentage of perfection and detachable blank sheets.

5. An educational device comprising a tablet with blank sheets and with sample penmanship plates each marked to indicate percentages of perfection whereby the penmanship student may compare matter he has written on the blank sheets with the marked plates and grade his work accordingly.

In testimony whereof I hereby affix my signature.

SCHUYLER C. DOBSON.

Copies of this patent may be obtained for five cents each, by addressing the "Commissioner of Patents, Washington, D. C."